United States Patent
Yao et al.

(10) Patent No.: US 6,873,497 B2
(45) Date of Patent: Mar. 29, 2005

(54) SYSTEM AND METHOD FOR IMPROVING PIEZOELECTRIC MICRO-ACTUATOR OPERATION BY PREVENTING UNDESIRED MICRO-ACTUATOR MOTION HINDRANCE AND BY PREVENTING MICRO-ACTUATOR MISALIGNMENT AND DAMAGE DURING MANUFACTURE

(75) Inventors: Minggao Yao, Dongguan (CN); Yiru Xie, Dongguan (CN)

(73) Assignee: SAE Magnetics (H.K.) Ltd., Kwai Chung (HK)

( * ) Notice: Subject to any disclaimer, the term of this patent is extended or adjusted under 35 U.S.C. 154(b) by 191 days.

(21) Appl. No.: 10/293,697

(22) Filed: Nov. 12, 2002

(65) Prior Publication Data

US 2004/0001289 A1 Jan. 1, 2004

(30) Foreign Application Priority Data

Jun. 26, 2002 (WO) .............................. PCT/CN02/00440

(51) Int. Cl.[7] .............................. G11B 5/56; G11B 21/24
(52) U.S. Cl. ................................ 360/294.4; 360/245.7; 360/245.9
(58) Field of Search ........................... 360/294–294.7, 360/245.7, 245.8, 245.9

(56) References Cited

U.S. PATENT DOCUMENTS

| 6,108,175 A | 8/2000 | Hawwa et al. ........... 360/294.4 |
| 6,376,964 B1 * | 4/2002 | Young et al. ............ 360/244.5 |
| 6,549,375 B1 * | 4/2003 | Crane et al. ............. 360/294.3 |
| 2001/0021086 A1 * | 9/2001 | Kuwajima et al. ....... 360/294.4 |

FOREIGN PATENT DOCUMENTS

| EP | 0-591-885 A2 | 4/1994 | ............ G11B/5/00 |
| EP | 0 591 885 A2 | 4/1994 | ............ G11B/5/00 |
| JP | 2002100142 A1 | 4/2002 | ............ G11B/21/21 |

* cited by examiner

Primary Examiner—Craig A. Renner
(74) Attorney, Agent, or Firm—Kenyon & Kenyon

(57) ABSTRACT

A system and method for improving piezoelectric micro-actuator operation by preventing undesired micro-actuator motion hindrance and by preventing micro-actuator misalignment during manufacture. A shim element is interposed between an electric circuit assembly and a lower portion of an actuator frame. The electric circuit assembly has a generally 'O'-shaped portion configured so that an upper portion of said actuator frame is able to protrude through the 'O'-shaped portion. The shim element is coupled between the electric circuit assembly and the lower portion of the actuator frame.

30 Claims, 6 Drawing Sheets ized. In another embodiment, the suspension tongue 312
SYSTEM AND METHOD FOR IMPROVING PIEZOELECTRIC MICRO-ACTUATOR OPERATION BY PREVENTING UNDESIRED MICRO-ACTUATOR MOTION HINDRANCE AND BY PREVENTING MICRO-ACTUATOR MISALIGNMENT AND DAMAGE DURING MANUFACTURE

BACKGROUND INFORMATION

The present invention relates to magnetic hard disk drives. More specifically, the present invention relates to a system and method for improving piezoelectric micro-actuator operation by preventing undesired micro-actuator motion hindrance and by preventing micro-actuator misalignment.

In the art today, different methods are utilized to improve recording density of hard disk drives. FIG. 1 provides illustrations of a typical drive arm configured to read from and write to a magnetic hard disk. Typically, voice-coil motors (VCM) 102 are used for controlling a hard drive's arm 104 motion across a magnetic hard disk 106. Because of the inherent tolerance (dynamic play) that exists in the placement of a recording head 108 by a VCM 102 alone, micro-actuators 110 are now being utilized to 'fine-tune' head 108 placement, as is described in U.S. Pat. No. 6,198,606. A VCM 102 is utilized for course adjustment and the micro-actuator 110 then corrects the placement on a much smaller scale to compensate for the VCM's 102 (with the arm 104) tolerance. This enables a smaller recordable track width, increasing the 'tracks per inch' (TPI) value of the hard drive (increased drive density).

FIG. 2 provides illustrations of a drive arm as used in the art. To provide electrical connections to the head 202, a flex-cable suspension assembly (FSA) 204, having electrical traces 206, is provided and attached to the arm 212. The FSA 204 provides electrical connectivity between bond pads 208 near the VCM (not shown) and bonding pads 210 at the head 202.

Attaching the head 202 directly to the FSA 204 as shown presents problems in head alignment as well as problems with micro-actuator operation, as explained below. Further, the present means of attaching the FSA 204 to the arm 212 causes problems relating to assuring suspension stiffness and correct head attitude as well as other problems. It is therefore desirable to have a system and method to prevent the above-mentioned problems in addition to having other benefits.

DETAILED DESCRIPTION

Figure 3:
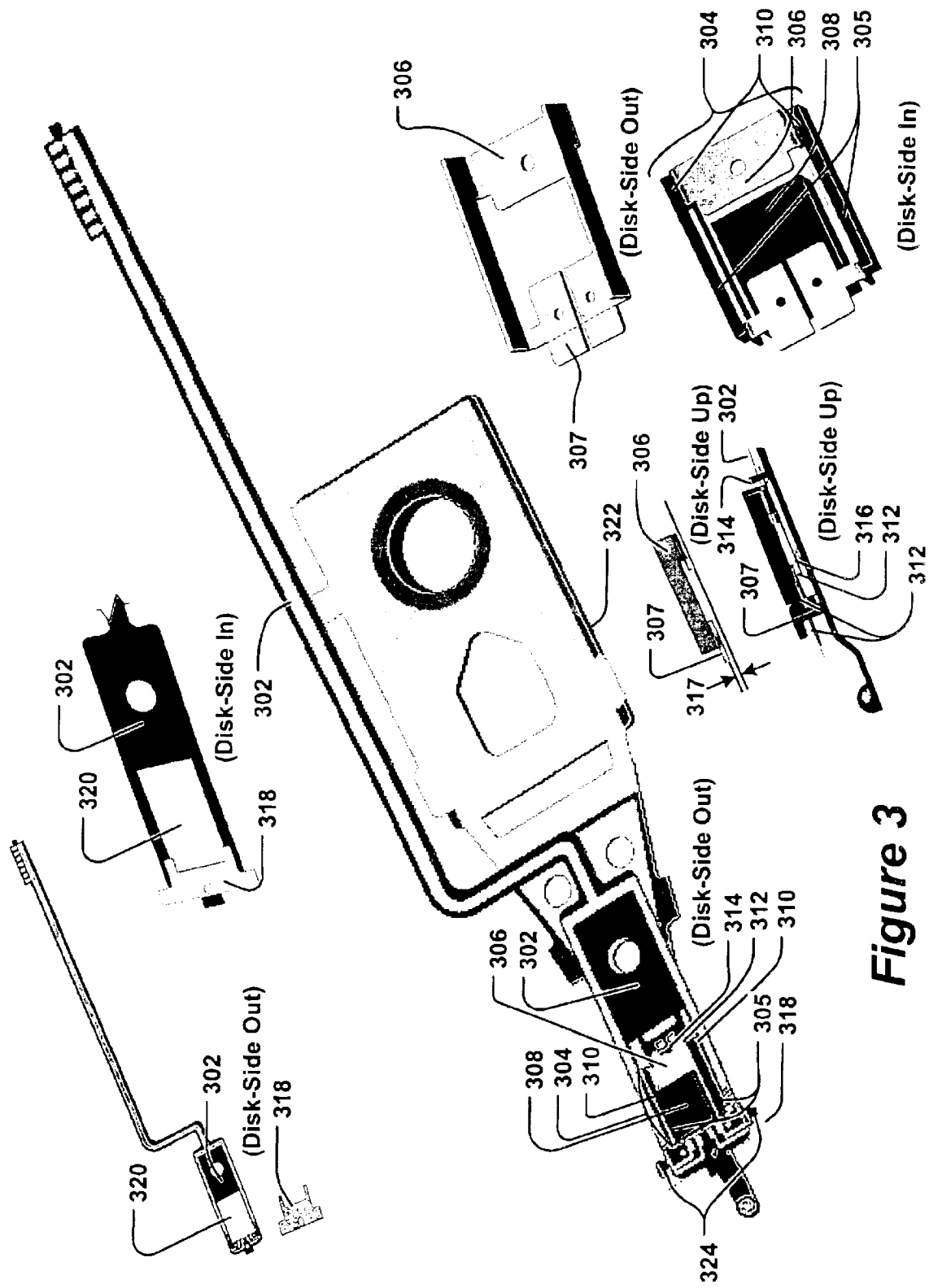
FIG. 3 provides illustrations of a drive arm with FSA under principles of the present invention.

FIG. 3 provides illustrations of a drive arm with FSA under principles of the present invention. In one embodiment, the FSA has an ('O'-shaped) opening that allows the FSA to fit over the micro-actuator 304 without interference. In an embodiment, the micro-actuator 304 is composed of an actuator frame 306 that cradles the head 308 and piezoelectric members 310 on either side to perform fine adjustments of the head 308 location. To provide shock resistance, a suspension tongue 312, which is attached to the actuator frame 306 by an adhesive such as epoxy or resin, is utilized. In another embodiment, the suspension tongue 312 is attached to the actuator frame 306 by a welded bond, such as by laser welding. The suspension tongue 312 is restrained at one end by a 'hammer' or 'T'-shaped element (second hook element) 314 and supported at the other end by a dimple 316.

Figure 1:
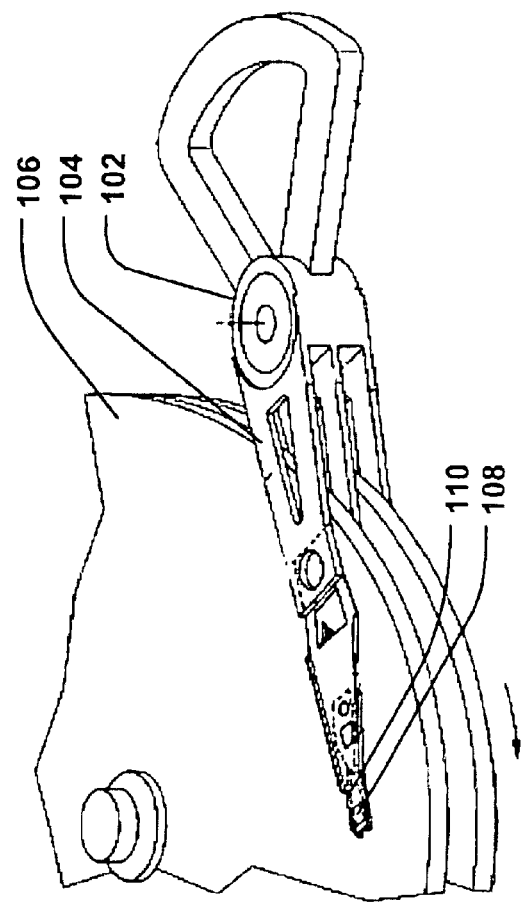
FIG. 1 provides illustrations of a typical drive arm configured to read from and write to a magnetic hard disk.
Figure 1:
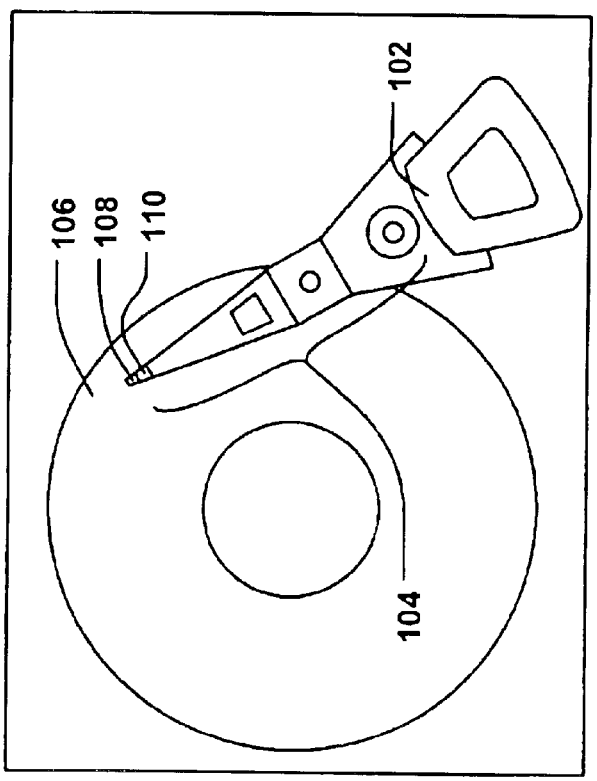
Figure 2:
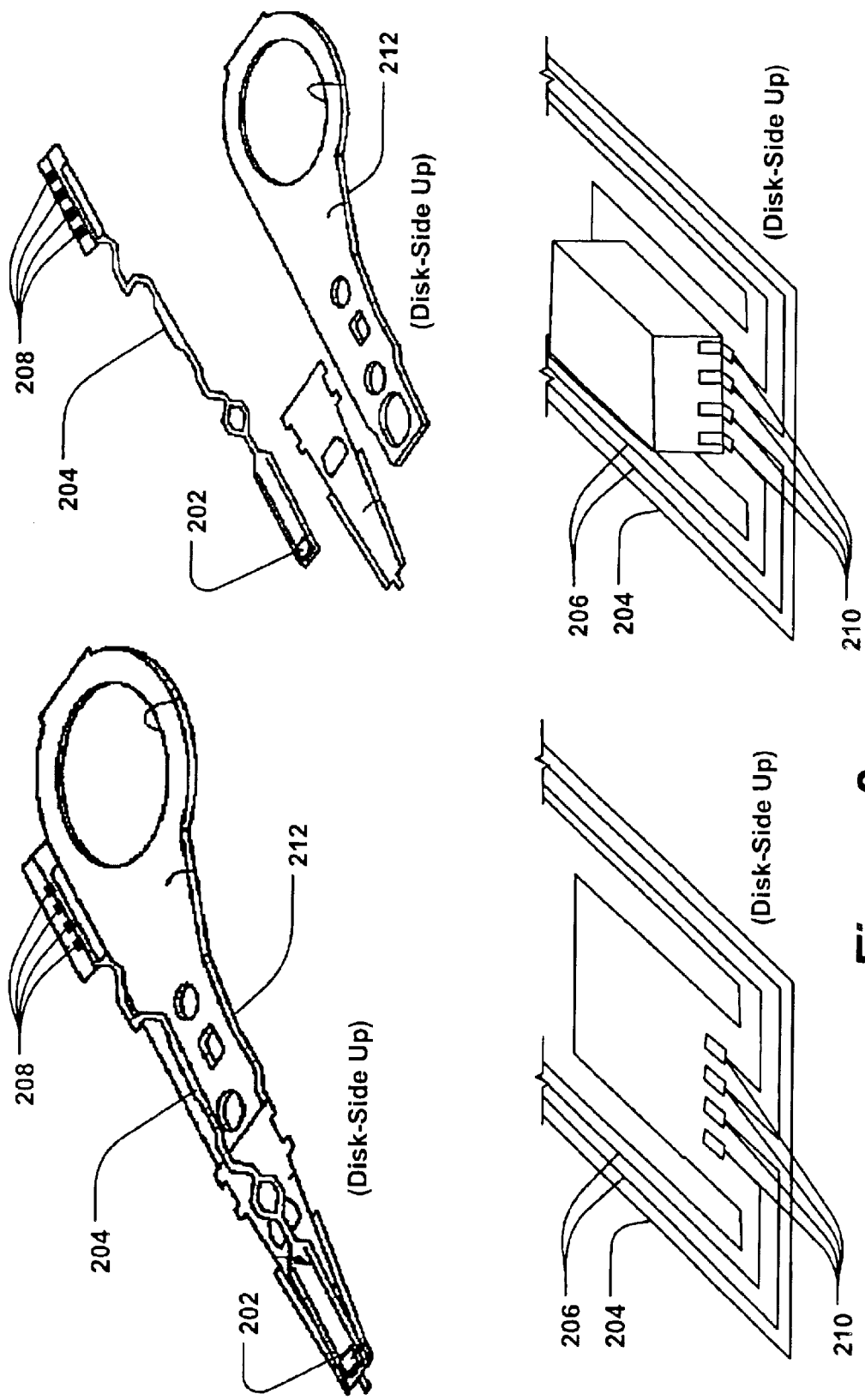
FIG. 2 provides illustrations of a drive arm as used in the art.

To provide correct suspension function and for proper head alignment in an embodiment, there needs to be a 25 to 50 micro-meter (um) gap 317 between the actuator frame 306 and the suspension tongue 312 over the dimple 316. Utilizing an FSA 204 similar in design to the one illustrated in FIG. 2 for an actuator similar to the one illustrated in FIG. 3, proper head alignment is difficult. Because the head 202 is attached to the FSA 204 and the FSA 204 is attached to the arm 212, force must be applied to the suspension components through the head 308 and FSA 302 as the head 308 is coupled to the FSA 302 and the FSA 302 is coupled to the actuator frame 306. During the process of bonding with adhesives such as epoxy or resin, force must be applied to enable a proper bond. Because the suspension enables the actuator frame 306 to move, force applied to the head 308 is transferred to the suspension components, potentially over-bending and damaging the suspension tongue 312, throwing the head 308 out of alignment (angle of attitude). Further, suspension damage, etc. may occur upon removal of the head 308 or FSA 302 (for replacement of a defective component, etc.) by over-exerting the suspension tongue. Also, with an FSA 204 such as is shown in FIG. 2, the stiffness of the FSA 204 greatly affects the process of ramp loading/unloading. FSA 204 stiffness, which is too great, would require increased loading force for the system.

In one embodiment of the present invention, a shim 318 of a material such as stainless steel is utilized with an FSA 302 having an opening 320 for a micro-actuator 304. As shown in FIG. 3, the shim 318 is coupled to the FSA 302 with a bonding agent such as epoxy or resin. The FSA 302 is coupled to a suspension structure 322 at the end of a drive arm (not shown) with a bonding agent such as epoxy or resin on portions of the FSA 302 closer to the VCM (not shown) than the micro-actuator 304. Because the shim 318, which is rigid, is coupled to the FSA 302 before the FSA 302 is attached to the suspension structure 322, along with the fact that the FSA 302 is bonded directly to the actuator frame 306 only at the front (away from the VCM), no undue pressure needs to be applied directly to the suspension tongue 312, preventing potential damage/misalignment.

In one embodiment, the micro-actuator frame is coupled to the suspension tongue 312 before the FSA 302 (with shim 318) is coupled to the suspension structure 322. In an alternative embodiment, the FSA 302 (with shim 318) is coupled to the suspension structure 322 before the micro-actuator frame is coupled to the suspension tongue 312.

In one embodiment, the head 308 and piezoelectric transducers 305 are coupled to the micro-actuator frame 306 before the micro-actuator frame 306 is coupled to the suspension tongue 312. In an alternative embodiment, the micro-actuator frame 306 is coupled to the suspension tongue 312 before the head 308 and piezoelectric transducers 305 are coupled to the micro-actuator frame 306.

As explained above, the shim 318 is bonded to the FSA 302 and then the FSA is coupled to the suspension structure 322. In an embodiment, this is done by fitting the shim 318 (attached to the FSA 302) under motion-limiting, angled tabs 324 (first book), bonding the FSA to the suspension structure 322 at the back (toward the VCM), and bonding the shim 318 to the front edge 307 of the actuator frame 306. This makes it possible to avoid applying direct pressure to the suspension tongue 312.

Figure 4:
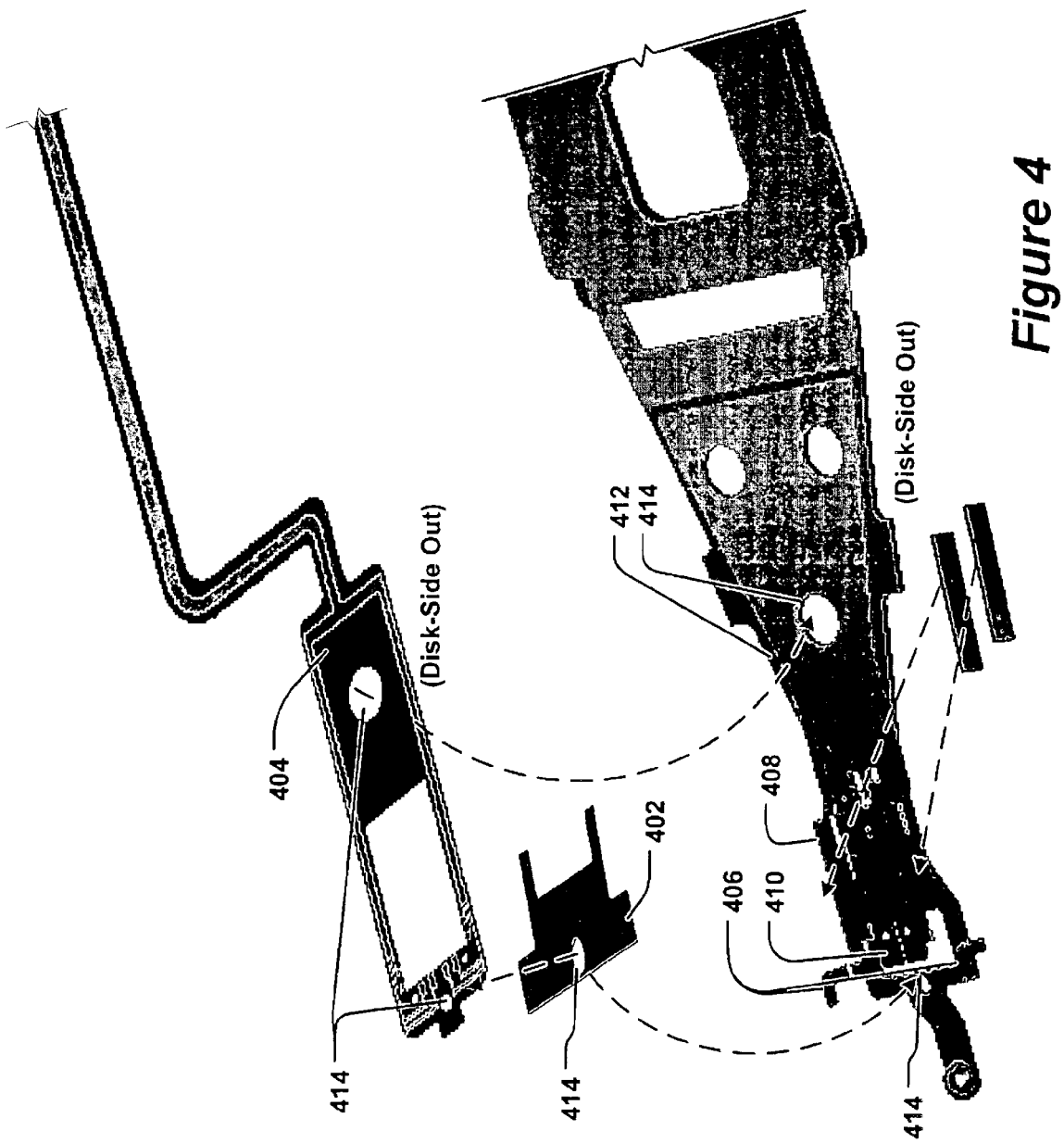
FIG. 4 further illustrates the assembly of the FSA, shim, and drive arm under principles of the present invention.

FIG. 4 further illustrates the assembly of the FSA, shim, and suspension structure under principles of the present invention. In one embodiment, the shim 402 is bonded to the FSA 404 (to the underside of the FSA 404, as depicted). The FSA 404 and shim 402 are positioned to hook the (motion-limiting) angled tabs 406 over the ends of the shim 402. In an embodiment, the shim 402 which is bonded to the FSA 404 is bonded to the front portion 410 of the actuator frame 408 (to the top side of the actuator frame 408, as depicted), and the FSA 404 is bonded to the suspension structure (end piece of the drive arm) 412. Alignment holes 414 are used for correct positioning of the shim 402 and FSA 404 over the suspension structure 412.

Figure 5:
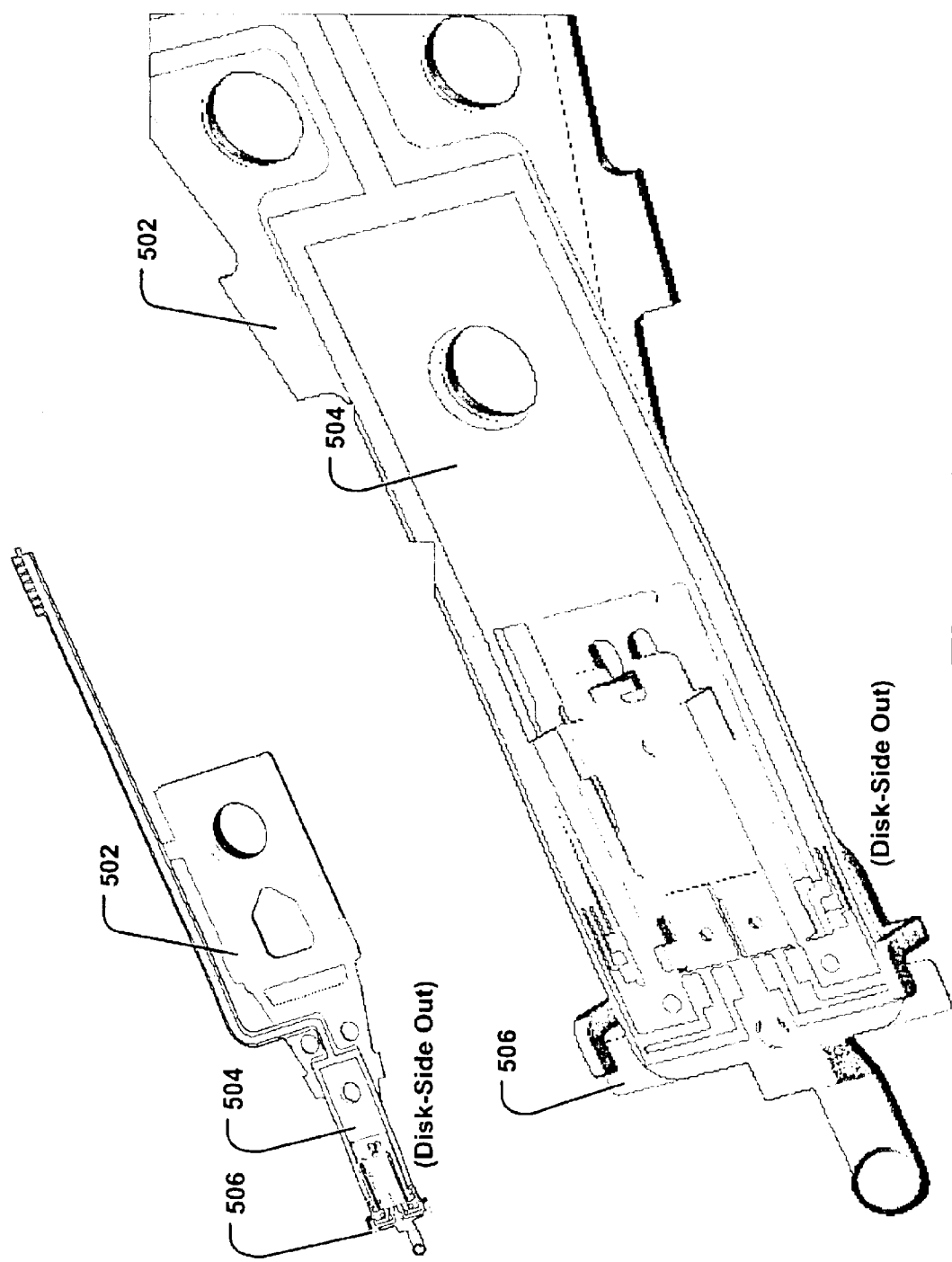
FIG. 5 provides a close-up image of the arm with the FSA and shim and without the head and piezoelectric transducers attached under principles of the present invention.
Figure 6:
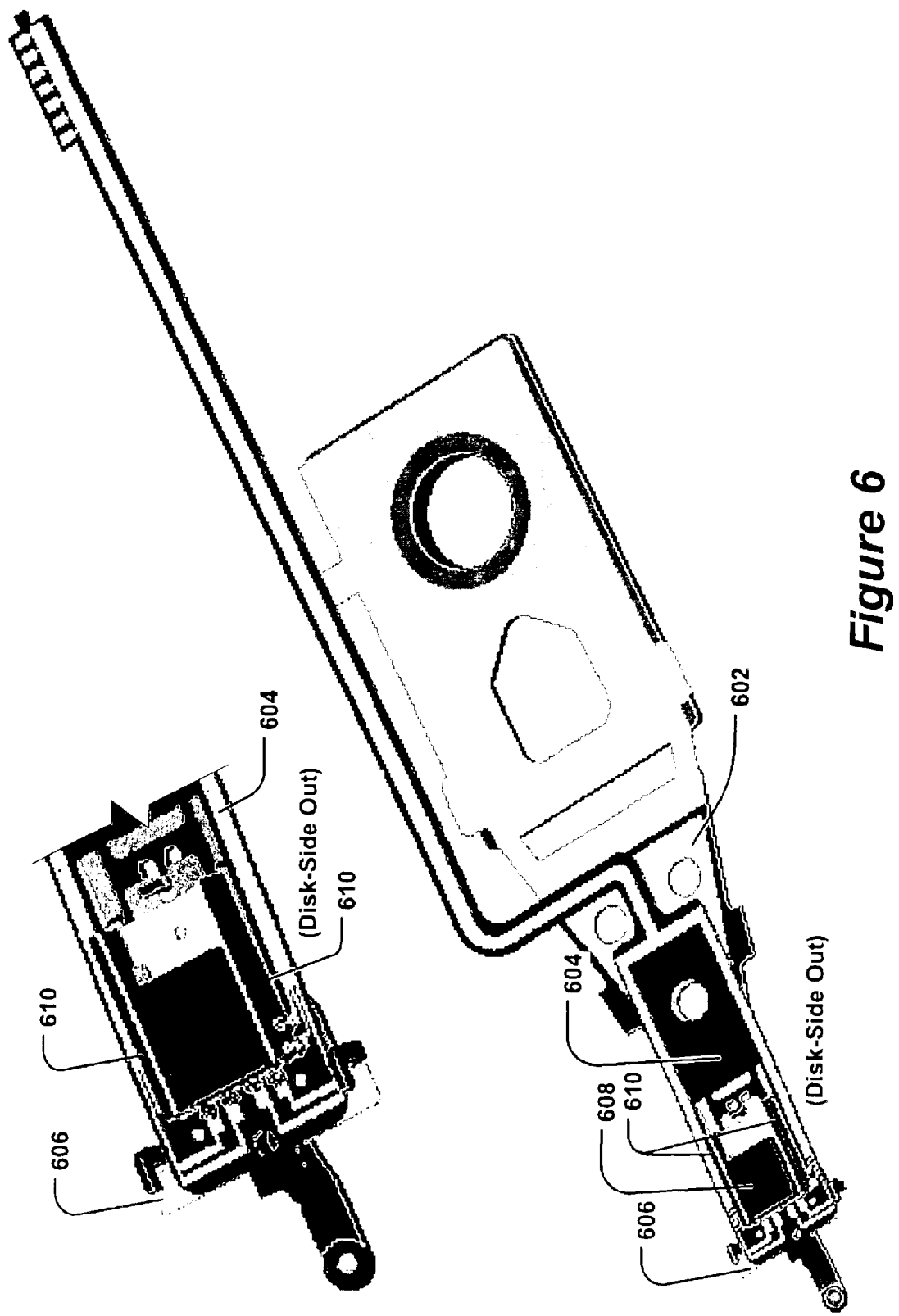
FIG. 6 provides a close-up image of the arm with the FSA and shim and with the head and piezoelectric transducers attached under principles of the present invention.

FIG. 5 provides a close-up image of the suspension structure 502 with FSA 504 and shim 506 and without the head and piezoelectric transducers attached under principles of the present invention, and FIG. 6 provides a close-up image of the suspension structure 602 with FSA 604 and shim 606 and with the head 608 and piezoelectric transducers 610 attached under principles of the present invention.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system comprising:
    a shim element interposed between an electric circuit assembly and a lower portion of an actuator frame, wherein
    said electric circuit assembly has a generally 'O'-shaped portion configured such that an upper portion of said actuator frame is able to protrude through said 'O'-shaped portion; and
    said electric circuit assembly is coupled to said shim element and said shim element is to be coupled to said lower portion.

2. The system of claim 1, further comprising:
    an arm element to be coupled to said shim element and to said actuator frame.

3. The system of claim 2, wherein the actuator frame is to be coupled to a suspension tongue of said arm element.

4. The system of claim 3, wherein motion of the actuator frame away from the arm element is to be limited by a first hook element interfaced with said shim element and by a second hook element interfaced with said suspension tongue.

5. The system of claim 1, wherein the actuator frame is a frame of a piezoelectric micro-actuator.

6. The system of claim 1, wherein said electric circuit assembly is a flex-cable suspension assembly.

7. The system of claim 1, wherein said electric circuit assembly is coupled to said shim element by a material from a group consisting of epoxy and resin.

8. The system of claim 1, wherein said shim element is coupled to said lower portion by a material from a group consisting of epoxy and resin.

9. The system of claim 1, wherein the actuator frame is a metal.

10. The system of claim 1, wherein the shim element is stainless steel.

11. A system for a hard disk drive comprising:
    an electric circuit assembly having a generally 'O'-shaped portion, wherein
    said 'O'-shaped portion is configured such that an upper portion of an actuator frame is able to protrude through said 'O'-shaped portion;
    said electric circuit assembly is coupled to a shim element and said shim element is coupled to a lower portion of said actuator frame; and
    said shim element is interposed between said electric circuit assembly and said lower portion.

12. The system of claim 11, further comprising:
    an arm element coupled to said shim element and to said actuator frame.

13. The system of claim 12, wherein the actuator frame is coupled to a suspension tongue of said arm element.

14. The system of claim 13, wherein motion of the actuator frame away from the arm element is to be limited by a first hook element interfaced with said shim element and by a second hook element interfaced with said suspension tongue.

15. The system of claim 11, wherein the actuator frame is a frame of a piezoelectric micro-actuator.

16. The system of claim 11, wherein said electric circuit assembly is a flex-cable suspension assembly.

17. The system of claim 11, wherein said electric circuit assembly is coupled to said shim element by a material from a group consisting of epoxy and resin.

18. The system of claim 11, wherein said shim element is to be coupled to said lower portion by a material from a group consisting of epoxy and resin.

19. The system of claim 11, wherein the actuator frame is a metal.

20. The system of claim 11, wherein the shim element is stainless steel.

21. A method for manufacturing a system in a hard disk drive comprising:
    providing an electric circuit assembly having a generally 'O'-shaped portion configured such that an upper portion of an actuator frame protrudes through said 'O'-shaped portion; and coupling said electric circuit assembly to a shim element and said shim element to a lower portion of said actuator frame such that said shim element is interposed between said electric circuit assembly and said lower portion.

22. The method of claim 21, further comprising:

coupling an arm element to said shim element and to said actuator frame.

23. The method of claim 22, wherein the actuator frame is to be coupled to a suspension tongue of said arm element.

24. The method of claim 23, wherein motion of the actuator frame away from the arm element is to be limited by a first hook element interfaced with said shim element and by a second hook element interfaced with said suspension tongue.

25. The method of claim 21, wherein the actuator frame is to be a frame of a piezoelectric micro-actuator.

26. The method of claim 21, wherein said electric circuit assembly is a flex-cable suspension assembly.

27. The method of claim 21, wherein said electric circuit assembly is to be coupled to said shim element by a material from a group consisting of epoxy and resin.

28. The method of claim 21, wherein said shim element is to be coupled to said lower portion by a material from a group consisting of epoxy and resin.

29. The method of claim 21, wherein the actuator frame is of a metal.

30. The method of claim 21, wherein the shim element is stainless steel.

* * * * *